United States Patent [19]

Petersen et al.

[11] 3,725,990
[45] Apr. 10, 1973

[54] METHOD FOR MAKING NON-RETURN VALVES

[75] Inventors: Jörgen Hartvig Petersen, Nordborg; Leif Viggo Sturlason, Sonderborg, both of Denmark

[73] Assignee: Danfoss A/S, Nordborg, Denmark

[22] Filed: May 12, 1971

[21] Appl. No.: 142,553

[30] Foreign Application Priority Data

Apr. 30, 1970  Germany.....................P 20 21 283.3

[52] U.S. Cl. ...............................29/157.1, 137/539
[51] Int. Cl. ...............................................B21d 53/00
[58] Field of Search ...................................29/157.1 R

[56] References Cited

UNITED STATES PATENTS 1,509,430  9/1924  Horsburgh......................29/157.1 X
2,398,698  4/1946  Crowley..........................29/157.1
3,430,647  3/1969  Suchowolec....................29/157.1 X
3,504,701  4/1970  Gross..............................29/157.1 X
3,505,718  4/1970  Carlstrom.......................29/157.1

Primary Examiner—Martin P. Schwadron
Assistant Examiner—David J. Zobkiw
Attorney—Wayne B. Easton

[57] ABSTRACT

The invention relates to a one-way valve and to a method for manufacturing a one-way valve. The method involves drawing a cup-shaped housing from sheet metal in several stages and punching a valve seat in the bottom of the cup. A shoulder is formed in the housing by means of a profiled drawing mandrel and by fitting a washer against the shoulder to serve as a backing member for a tapered spring.

4 Claims, 6 Drawing Figures

PATENTED APR 10 1973  3,725,990

METHOD FOR MAKING NON-RETURN VALVES

The invention relates to a method of producing a replaceable non-return valve comprising a housing formed with a valve seat and shaped to fit into an aperture, a pipe or the like, the valve also having a spring loaded preferably spherical closure member.

Such replaceable non-return valves are used for a very large number of purposes, e.g. in water-supply systems, in hydraulic plants, in fuel-oil supply system etc. They are used for preventing back-flow, for maintaining a prescribed pressure in front of the valve and for other purposes.

In practice, it is important that such replaceable non-return valves should operate in a reliable and very accurate manner, but also that they should be produced as cheaply as possible. Hitherto, these two requirements have run counter to each other, since the cheaper the method of production, the greater have been the dimensional tolerances that have had to be accepted when assembling the valve. In particular, even small differences in the length of the fitted spring lead to considerable differences in the spring-bias and thus in the mode of operation of the valve. If however, closer manufacturing tolerances have been aimed at by the use of carefully produced turned parts, then the cost of such a replaceable non-return valve becomes too high.

The object of the invention therefore is to provide a method of producing a replaceable non-return valve cheaply on the one hand, but with the maximum precision on the other.

According to the invention, this object is achieved by drawing a cup-shaped housing from sheet-metal in several stages and punching a valve seat in the bottom of the cup, by forming a shoulder in the housing by means of a profiled drawing mandrel having a portion of greater diameter at a predetermined distance from its end-face, and by fitting against the shoulder a backing member for a spring which engages a valve closure member.

Firstly, the drawing operation provides a very precise outside diameter for the valve housing. This ensures that the valve can be accurately fitted into a aperture a pipe or the like. In the last stage of the drawing operation a very accurately defined distance between the valve seat in the base and the shoulder in the wall of the housing is provided by the profiled mandrel. Since the backing member is to be fitted against this shoulder, the distance between the valve seat and the end-face of the backing member presented to it is also accurately determined. Despite the inexpensive method of production by drawing, the same characteristics are imparted to all valves when similar closure members and springs are used.

The valve seat is preferably punched out prior to the last stage of the drawing operation. The precise dimension between the valve seat and the shoulder is therefore not adversely affected by the punching operation.

The housing can be drawn from a round flat blank in such a manner that the bottom of the cup slopes downwards away from the periphery towards the valve seat. A form of base of this kind not only facilitates drawing, but also ensures that the closure member is correctly centered in relation to the valve seat. After drawing, the required length of housing can be obtained by a severing operation. The unevenness which may occur at the free end of the housing after drawing is thus eliminated.

Preferably in a replaceable non-return valve produced in accordance with the method of the invention the backing member, constituted by a washer, is secured against the shoulder by turning the thinned wall of the housing over towards the shoulder. In this operation use is made of the fact that the forming of the shoulder leads to a thinning of the wall which can thus be readily turned over. No additional securing means, such as screw-threads or the like, are required to hold the washer or other backing member exactly in the required position.

The spring is preferably of frusto-conical form, widening from the spherical closure member towards the backing member. The spring is then backed by the backing member near the shoulder, so that the greatest possible accuracy as regards required length of spring is achieved. Furthermore, the backing member is additionally supported by the flanged edge at this point.

An embodiment of the invention will now be described in greater detail by way of example with reference to the accompanying drawings, in which.

Figure 1:
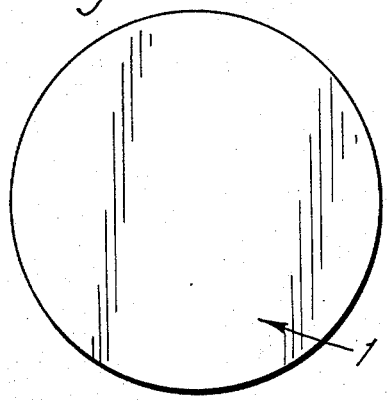
FIGS. 1 to 5 show a housing blank in the various stages of production.

Referring to the drawings, FIG. 1 shows a round plate 1 from which the housing is drawn.

Figure 2:
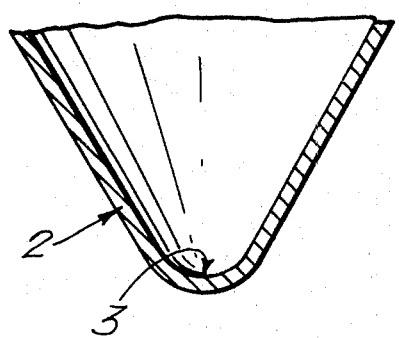

FIG. 2 shows a blank 2 after the first stage in the drawing operation. The bottom 3 is of part-spherical shape, and this considerably facilitates the drawing.

Figure 3:
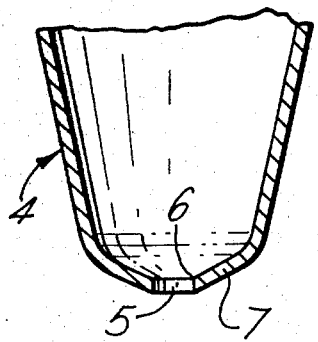

FIG. 3 shows the housing blank 4 after the second stage of the drawing operation, during which a hole 5 is punched in the base so as to form a valve seat 6. The final conical form has already been largely imparted to the base 7.

Figure 4:
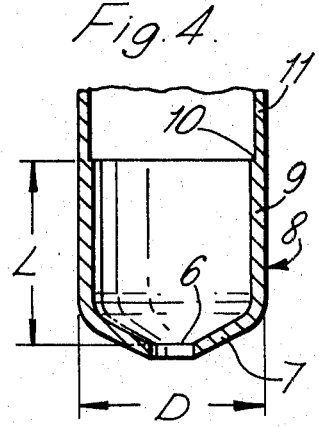

FIG. 4 shows the housing blank 8 after the last stage in the drawing operation. A shoulder 10 has been formed in the wall 9 by means of a profiled drawing mandrel, so that the portion 11 of the wall extending towards the free end is thinner than the remaining portion of the wall. The length L, i.e. the distance between the valve seat 6 and the shoulder 10, can be very precisely determined by using the profiled mandrel. The outside diameter D of the housing blank 8 is also accurately determined by the inside diameter of the outer drawing tool.

Figure 5:
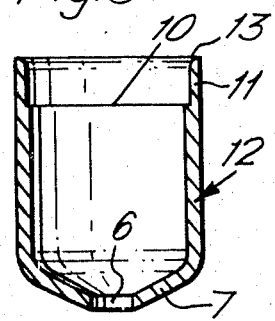
Figure 6:
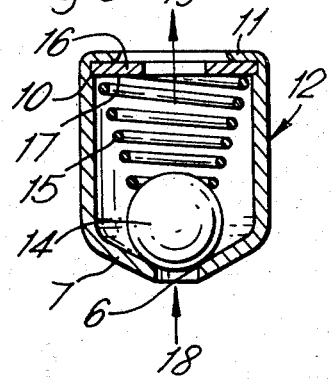
FIG. 6 shows the valve ready for use.

In FIG. 5, the production of the housing 12 is shown completed. This Figure corresponds to that of FIG. 4, but the blank 8 has been severed at the free end 13 to give the required length.

In the further assembly of the valve, a spherical closure member 14 and a taper-wound spring 15 are inserted in the housing 12. A washer 16 is used as the backing member for the spring, this washer bearing by its inner face 17 against the shoulder 10. The portion 11 of the wall of reduced thickness is turned over inwards and in this way secures the backing washer 16 firmly against the shoulder 10.

The valve so produced is now ready for insertion in, say a pipe through which flow of a fluid is to be controlled. Fluid flowing in the direction of the arrow 18 can lift the closure member 14 to overcome the force of the spring 15, when the pressure of the fluid is sufficient. The fluid then flows through the washer 16 in the direction of the arrow 19.

The invention enable extremely small non-return valves to be produced, the axial length and the diameter of the housing being as little as 5 to 10 millimeters. Despite this, valves constructed as described operate in a very accurate manner.

What we claim is:

1. A method of producing a one-way valve assembly comprising the steps of drawing from sheet-metal in several stages a cup-shaped housing, punching a valve seat in the bottom of said housing, using a profiled drawing mandrel in a drawing operation to form a cylindrically shaped wall having an internal shoulder and a cylindrically shaped free end of reduced thickness surrounding said shoulder, said drawing mandrel having a portion of greater diameter at a selected distance from its end-face, fitting a backing member against said shoulder and bending said free end inwardly into contact with said backing member.

2. A method according to claim 1 in which said valve seat is punched in the bottom of said housing prior to the last stage of said drawing operation.

3. A method according to claim 2 in which said housing is drawn from a round flat blank in such a manner that the bottom of said housing slopes downwards from the periphery towards the area of said valve seat.

4. A method according to claim 1 in which after said drawing the required length of said housing is obtained by a severing operation.

* * * * *